June 6, 1944.    H. W. LORD    2,350,785
ELECTRIC RELAY MEANS
Original Filed May 31, 1940

Inventor:
Harold W. Lord,
by Harry E. Dunham
His Attorney.

Patented June 6, 1944

2,350,785

UNITED STATES PATENT OFFICE 2,350,785

ELECTRIC RELAY MEANS

Harold W. Lord, Schenectady, N. Y., assignor to General Electric Company, a corporation of New York Original application May 31, 1940, Serial No. 338,000. Divided and this application April 1, 1941, Serial No. 386,343

6 Claims. (Cl. 175—337)

My invention relates to electric apparatus, such as electric relay means.

This application is a division of my copending patent application, Serial No. 338,000, filed May 31, 1940, and which is assigned to the assignee of the present application.

In the protection of electric apparatus, such as electric valve apparatus, it is frequently desirable to provide protective means of simple construction and arrangement which is readily adaptable to a variety of structures in order to obtain an indicating or controlling operation in response to a predetermined electrical condition of associated apparatus. In accordance with the teachings of my invention described hereinafter, I provide a new and improved relay means and protective apparatus for electrical devices.

It is an object of my invention to provide a new and improved control and protective system for electrical apparatus.

It is another object of my invention to provide a new and improved electromagnetic relay selectively responsive to unidirectional magnetization of associated electrical apparatus.

It is a further object of my invention to provide a new and improved relay means associated with inductive apparatus which is arranged to operate in response to a magnetic condition of the apparatus and which is of simple construction and arrangement.

Briefly stated, in the illustrated embodiment of my invention, I provide a protective means, such as a relay means selectively responsive to the unidirectional magnetization or responsive to a magnetic condition of associated electrical apparatus. More particularly, I provide relay means which is selectively responsive to the unidirectional magnetization of the core member of associated inductive apparatus and in which the relay is readily adaptable for mounting on the core structure of the apparatus. The relay means comprises a supporting frame which is mounted on or physically adjacent to the core structure of the induction apparatus and is arranged to be selectively responsive to the unidirectional magnetization of the core structure.

Figure 2:
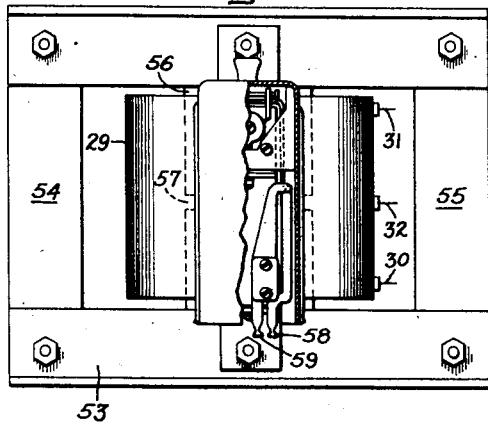
Figure 3:
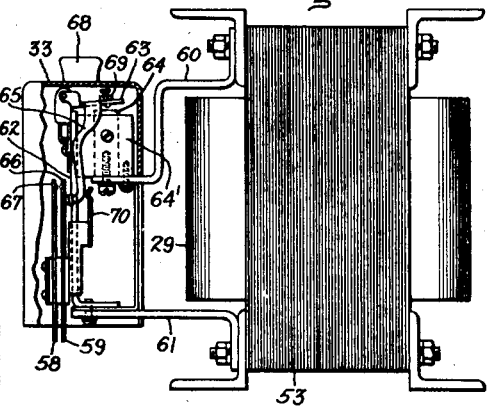
Figure 1:
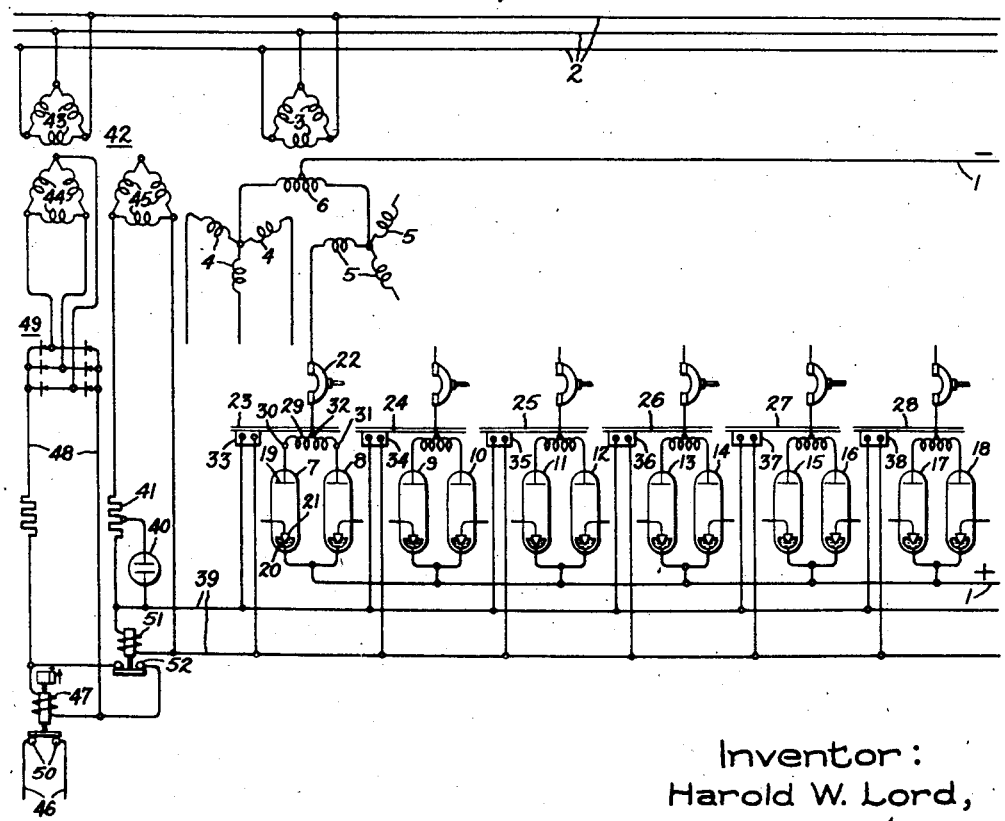

For a better understanding of my invention, reference may be had to the following description taken in connection with the accompanying drawing, and its scope will be pointed out in the appended claims. Fig. 1 diagrammatically illustrates an embodiment of my invention as applied to a polyphase electric valve rectifying system. Figs 2 and 3 diagrammatically illustrate another embodiment of my invention including a protective relay means associated with the core member of a current-dividing reactor and which is responsive to the unidirectional magnetization of the core member.

Referring now to Fig. 1 of the drawing, I have diagrammatically illustrated my invention as applied to an electric valve converting system, such as a polyphase rectifier for energizing a direct current load circuit 1 from an alternating current supply circuit 2 through electric translating apparatus comprising a transformer having primary windings 3 and groups of secondary windings 4 and 5. An interphase transformer 6 may be connected between the two groups of secondary windings so that the system operates as a double three-phase system. The translating apparatus also includes electric valves 7–18, inclusive, which transmit current between the supply circuit and the load circuit. Electric valves 7–18 are preferably of the type employing an ionizable medium, such as a gas or a vapor, and each comprises an anode 19, a cathode such as a mercury pool cathode 20, and may be of the type comprising an immersion-igniter control member 21 associated with the cathode 20. In this instance, of course, where a mercury pool cathode is employed, the ionizable medium is mercury vapor. If desired, suitable switching means such as circuit breakers 22 may be connected in series relation with the electric valves 7–18, inclusive.

In order to control the electric valves 7–18 so that pairs of electric valves conduct current in parallel relationship, I provide current-dividing reactances or reactors 23–28, inclusive, associated with the respective pairs of electric valve means. Each of the reactors 23–28 is provided with a winding 29 having terminal connections 30 and 31 and an electrically intermediate connection 32, so that the winding is divided into differential sections; that is, the current flowing through the respective portions of the winding tends to establish opposing magnetomotive forces in the core members of the reactors.

As an agency for producing a controlling effect when the electric valve means in each pair departs from the normal or intended mode of operation, I provide means attached to the core members of the reactors and which is responsive to the unidirectional magnetization of the core members. This means may comprise relays 33–38 associated with the core members of the reactors 23–28, respectively.

To obtain an indication or controlling effect when either of the electric valve means in each pair departs from its normal or intended mode of operation, I employ a control circuit 39 which is connected to contacts of the relays 33–38. The circuit 39 may comprise indicating means, such as a glow discharge valve 40 having a critical minimum ionizing potential connected across a suitable voltage divider 41. The circuit for energizing the glow discharge valve 40 is completed through the contacts of relays 33–38. The indicating or control circuit 39 may be energized from a suitable source of current, such as the alternating current circuit 2, through a transformer 42 having a primary winding 43 and secondary windings 44 and 45. The secondary winding 45 is connected to energize the control or indicating circuit 39.

I also employ a second control or indicating circuit 46 to obtain a controlling effect when one of the electric valves is subjected to irregular operation for a predetermined interval of time. This circuit may comprise a time delay relay of contactor 47 energized from a suitable source, such as a source of direct current 48, which may be supplied by a rectifier 49 energized from secondary windings 44 of transformer 42. Normally, the contactor 47 is in the deenergized position, maintaining its contacts 50 in the closed circuit position. A second relay or contactor 51, having normally closed contacts 52, is connected to short circuit the actuating coil of contactor 47 under normal operation. The energizing circuit for the actuating coil of relay 51 is normally energized from secondary windings 45. However, when the contacts of the relays 33–38 close, the actuating coil of relay 51 is short-circuited, thereby deenergizing the coil and permitting the contacts 52 to open and thereby energizing actuating coil of contactor 47. Contactor 47 may be arranged to operate with a time delay, so that circuit 46 is not opened unless the fault condition exists for a predetermined time or for a predetermined number of cycles of the voltage of circuit 2.

Certain features of the control and indicating circuits 39 and 46 are disclosed and claimed in Edwards Patent No. 2,305,380, dated December 15, 1942.

I also provide a relay system or a relay means responsive to the unidirectional magnetization of the core members of the reactors 23–28. Figs. 2 and 3 diagrammatically illustrate the relay means which I provide and are representative of the reactors 23–28 and associated relays 33–38 in Fig. 2.

Referring now more particularly to Fig. 2, a current-dividing reactor is there illustrated having a core member 53, preferably of the window type, having outer legs 54 and 55 and a middle leg 56, preferably provided with a high reluctance portion such as an air gap 57. The current-dividing winding 29, corresponding to the windings 29 of reactors 23–28 in Fig. 1, is provided with terminal connections 30 and 31 and an intermediate connection 32.

In order to obtain a controlling effect in response to the unidirectional magnetization of core member 53, I provide a relay such as relay 33 of Fig. 1 having contact connections 58 and 59. Referring to the arrangement shown in Fig. 3, the relay 33 comprises a supporting frame in physical contact with the core structure 53 and comprises flux transmitting members such as soft iron brackets 60 and 61 which are positioned in physical contact with the core member 53. The brackets 60 and 61 may be bolted to the core member 53 or may be attached by other suitable method or device. The relay 33 also comprises a further flux transmitting member 62 which is supported on the bracket 61. The member 62 supports an armature 63, which is attracted to a pole member 64 supported on bracket 60 when a unidirectional flux exists in the core 53. I provide a short circuited turn 64' of heavy copper around the iron forming the pole member 64 in order that the relay arm 63 is attracted only in response to the unidirectional component of flux and prevents the armature from being attracted in response to any alternating component of flux which may be present within the core member of the reactor. Armature 63 is provided with an arm 65 which is moved thereby to operate contacts 66 and 67 to close these contacts when a unidirectional flux is established in the core 53. A handle 68 is provided to assist in the removal of the cover for the relay.

Adjusting means, such as a screw 69, is provided on the armature 63 to establish or adjust the value of unidirectional flux at which contacts 66 and 67 are closed. In order that the contacts 66 and 67 may be closed within relatively short periods of time, that is, upon each failure to conduct of one of the associated electric valves, a suitable spring member 70 may be provided to prevent excessive movement of the arm 65 so that it is always held in engagement with contact 66.

The operation of the embodiment of my invention shown in Fig. 1 will be explained by considering the system when it is operating as a polyphase rectifier to energize the direct current load circuit from the alternating current supply circuit 2. The system operates as a double three-phase system by virtue of the interphase transformer 6. That is, each of the secondary windings in groups 4 and 5 conducts current for 120 electrical degrees but for only 60 electrical degrees with any one other secondary winding in another group. The electric valves 7–18 conduct current sequentially; that is, each pair of electric valves conducts current for 120 electrical degrees during each cycle of the voltage of the circuit 2 but for only 60 electrical degrees with any one other pair of electric valve means.

So long as each pair of electric valves conducts current in parallel relationship, there is no unidirectional flux established in the core members of the reactors 23–28. Hence, the circuits 39 and 46 will not afford an indication and will not introduce a controlling effect.

If one of the electric valves of a pair fails to conduct current, or misfires, the associated relay mounted on the core member of the associated reactor will close its contacts momentarily, impressing a suitable voltage across the terminals of the glow discharge valve 40, causing this glow valve to be luminescent and thereby affording an indication that one of the electric valves in the system has failed to conduit current at the intended time or has misfired. Concurrently with this action, the closing of the contacts of any one of the relays 33–38 also temporarily short-circuits the actuating coil of contactor 51. Due to the time delay action of the contactor 47 if this fault exists for a predetermined interval of time, control circuit 46 will be opened by contactor 47 to afford a second indication, an alarm, or to introduce a controlling or protective operation of the electric translating system.

The operation of the relays 33–38 may be more fully appreciated by referring to Figs. 2 and 3. Inasmuch as the two sections of the windings 29 are differentially arranged, so long as the associated pair of electric valves conduct current in parallel relationship there will be no unidirectional flux established in the core member 53. However, if one of the electric valves fails to conduct current there will be a net unidirectional magnetization present in the core member 53, causing an unidirectional flux to be established through the middle leg 56. The magnetomotive force appearing across the air gap 57 effects the transmission of magnetic flux through the brackets 60 and 61 and members 62 and 64 of relay 33. This flux operates the armature 63 and arm 65, effecting temporary closure of contacts 66 and 67. This operation is repeated every time one of the associated valves fails to conduct current, or loses control and fires at a time other than the intended time.

The contacts of the relays 33–38 are closed when the respective electric valves of each pair conduct unequal or disproportionate currents. That is, the relays operate when one of the electric valves of each pair of valves fails to conduct current during the predetermined intervals of time, and also operate when the electric valves lose control by failing to conduct current during the predetermined intervals. Furthermore, the relays also operate to afford an indication or initiate a controlling operation when the electric valves fail to begin to conduct current at predetermined instants, or when the electric valves are late in the initiation of the periods of conduction.

Contacts 66 and 67 of the relay 33 are operated to the closed circuit position only in response to a unidirectional magnetization appearing in the core member 53. The short-circuited turn 64' around the iron forming the magnetic pole for attracting the armature 63 prevents operation of the relay on alternating flux but freely allows the direct current component of flux to pass through the supporting frame for operation of the relay. A path for the alternating current flux in shunt with the armature, the working gap and the short-circuited turn 64' is provided across a gap defined by the end of the frame member 60 and the flux carrying member 62 which is supported on the frame member 61.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an inductive device having a core member and a winding having differentially opposed winding sections for impressing on said core member unidirectional and alternating components of magnetization, a magnetic supporting frame in physical contact with said core structure, an armature mounted on said frame and arranged to be actuated when the flux in said frame attains a predetermined value, and means associated with said frame including a short-circuited conductor for preventing actuation of said armature in response to alternating components of magnetization in said core.

2. In combination, an inductive device having a core member provided with a high reluctance section, a winding associated with said core member and having a pair of differential winding sections for impressing on said core member unidirectional and alternating components of magnetization, a magnetic supporting frame in physical contact with said core structure to bridge said high reluctance section and including an armature mounted on said frame, and means including a short-circuited conductor for preventing alternating magnetization of said frame to render said armature selectively responsive only to the unidirectional magnetization of said core member.

3. In combination, an inductive device comprising a core member of the window type having a middle leg provided with a high reluctance portion, a winding wound around said middle leg and comprising a pair of differential winding sections for impressing on said core member unidirectional and alternating components of magnetization, and means responsive to the unidirectional magnetization of said core member comprising a supporting frame in physical contact with said core member and arranged to bridge said high reluctance portion, a short-circuited conductor around at least a portion of said frame to suppress the alternating magnetization of said portion of said frame, and an armature member mounted on said frame and responsive to the magnetic flux conducted by said supporting frame.

4. In combination, an inductive device having a core member provided with a relatively high reluctance section and having winding means associated with said core member for producing both alternating and unidirectional components of magnetization, means comprising a magnetic supporting frame in physical contact with said core member and arranged to bridge said high reluctance section, an armature mounted on said frame, a pole member mounted on said frame and constituting a portion of the magnetic circuit of said frame, and means comprising a short circuited conductor around said pole member so that said armature is actuated only in response to unidirectional magnetization of said core member.

5. In combination, an inductive device having a core member provided with a relatively high reluctance section and having winding means associated with said core member for producing both alternating and unidirectional components of magnetization, means comprising a magnetic supporting frame in physical contact with said core member and arranged to bridge said high reluctance section, an armature mounted on same frame, a pole member mounted on said frame and constituting a portion of the magnetic circuit of said frame, and means associated with said frame for preventing operation of said armature due to the presence of alternating components of magnetization in said core member.

6. In combination, an inductive device having a core member provided with a relatively high reluctance section and having winding means associated with said core member for producing both alternating and unidirectional components of magnetization in said core, means comprising a magnetic supporting frame in physical contact with said core member and arranged to bridge said high reluctance section, an armature mounted on said frame, said frame including a pole portion which cooperates with said armature to provide a working gap, a short-circuited conductor around said pole portion for suppressing alternating magnetization of said core to render said armature responsive solely to unidirectional magnetization of said core, and means for establishing a path in shunt with said pole portion and said armature and cooperating with said short-circuited conductor for shunting alternating current flux from said working gap.

HAROLD W. LORD.